(12) United States Patent
Lee et al.

(10) Patent No.: US 8,542,241 B2
(45) Date of Patent: Sep. 24, 2013

(54) STEREOSCOPIC CONTENT AUTO-JUDGING MECHANISM

(75) Inventors: Jian-Wei Lee, Taipei County (TW); Chueh-Pin Ko, Taipei (TW); Hsin-Yu Chen, Taipei County (TW)

(73) Assignee: Acer Incorporated, Taipei County (TW)

( * ) Notice: Subject to any disclaimer, the term of this patent is extended or adjusted under 35 U.S.C. 154(b) by 610 days.

(21) Appl. No.: 12/769,671

(22) Filed: Apr. 29, 2010

(65) Prior Publication Data

US 2011/0267360 A1 Nov. 3, 2011

(51) Int. Cl.
*G06T 15/00* (2011.01)
(52) U.S. Cl.
USPC .......................................................... 345/522
(58) Field of Classification Search
USPC .......................................................... 345/522
See application file for complete search history.

(56) References Cited

U.S. PATENT DOCUMENTS

| | | | |
|---|---|---|---|
| 6,862,043 B1 | 3/2005 | Song | |
| 2002/0171872 A1* | 11/2002 | Matsunaga | 358/1.18 |
| 2004/0218269 A1 | 11/2004 | Divelbiss et al. | |
| 2006/0082587 A1* | 4/2006 | Noorbakhsh et al. | 345/544 |
| 2007/0041442 A1* | 2/2007 | Novelo | 375/240.12 |
| 2010/0053435 A1* | 3/2010 | Goziker et al. | 348/558 |

FOREIGN PATENT DOCUMENTS

| | | |
|---|---|---|
| CN | 1882106 A | 12/2006 |
| CN | 101025908 A | 8/2007 |
| CN | 101668221 A | 3/2010 |
| EP | 1 501 317 | 1/2005 |
| EP | 1501316 A1 * | 1/2005 |
| WO | WO 2007/040472 | 4/2007 |

OTHER PUBLICATIONS

European Search Report dated Nov. 2, 2011.
"VESA: Video Electronics Standards Association; E-EDID Implementation Guide;" P007901938; Version 1.0; 2001; pp. 1-18.
Chinese language office action dated Mar. 26, 2013.

* cited by examiner

*Primary Examiner* — Edward Martello
(74) *Attorney, Agent, or Firm* — McClure, Qualey & Rodack, LLP

(57) ABSTRACT

A method of playing an original 3D content on a 3D enabled monitor, where the 3D enabled monitor does not support the original 3D format type of the original 3D content. The method includes the steps of automatically reading a portion the original 3D content to obtain an identity of the original 3D format type, this portion may or may not be a tag, and reading this portion may include playing multiple frames of the 3D content. The preferred method further includes automatically detecting a monitor and its 3D display format type. If no match is found between the original 3D format type and the display format type, then the method deconstruct the original image content and reconstruct the image content into a 3D format type supported by the 3D display format type.

15 Claims, 7 Drawing Sheets

US 8,542,241 B2

STEREOSCOPIC CONTENT AUTO-JUDGING MECHANISM

CROSS-REFERENCE TO RELATED APPLICATIONS

Not Applicable.

BACKGROUND OF THE INVENTION (1) Field of the Invention

The field of the invention is image data processing and a protocol for labeling various types of data contained in a stereoscopic content media, more specifically, stereoscopic content processing.

(2) Description of Related Art including Information Disclosed under 37 CFR 1.97 and 1.98

Stereoscopic display technology has become available in the market with much advancements being made in recent years in stereoscopic movie production. Cost of making display hardware has lowered over the years, and there have been an increasing number of content providers producing stereoscopic contents. For a consumer, however, managing and watching stereoscopic movies on a DVD or via an Internet download has remained difficult. This is mainly due to the different signal formats, transmission formats and player formats currently available in the market place. For instance, consumers can download a stereoscopic player from the Internet so they can watch a 3D-DVD on a computer. Consumers, however, need to determine what format the 3D-DVD is (e.g., HQFS, Anaglyph or Sensio), and adjust the appropriate setting in the stereoscopic player. The consumers also need to know and select the appropriate output format of their 3D-enabled monitors (e.g., 120 Hz monitor, Barrier or Lenticular), and adjust the appropriate setting in the stereoscopic player. Consequently, watching a 3D-DVD has been a complicated and tedious process.

This complicated process is further made complex by the fact that 3D contents does not intrinsically contain non-printed information to inform a consumer regarding its format. In other words, while a consumer can look at the packaging of a 3D-DVD for format information, or look for the format of the 3D movie he's about to download by browsing through the website where it is being offered for download, a consumer has no other ways to recognize the format type, for example, by allowing the reader to read the 3D content and inform the consumer of the format type. The player either plays or does not play the 3D movie.

Additionally, when certain types of 3D contents are displayed by a projector (e.g., Texas Instruments' DLP® technology), sometimes the images are not displayed correctly and does not produce the desired 3D effect. When the user sees that the 3D image did not display properly, the user would need to go to the menu of the projector and select "invert" to correct the image display. This step is tedious and requires the user to first be able to recognize the incorrect inversion of the images.

There is a continuing need for new ways to watch 3D contents in a less complicated process.

There is also a continuing need for ways for a consumer to recognize the format type of a 3D content without resorting to printed information given by the content provider. It is therefore an object of the present invention, to provide a storage format for the pre-recorded 3D content that is easily recognizable and selectable by a consumer in regard to general content and specific content.

There is also a continuing need to automatically detect the situation where it becomes necessary to perform the function of inverting images so that a user need not make such determination by his own naked eyes.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The invention may seek to satisfy one or more of the above-mentioned desires. Although the present invention may obviate one or more of the above-mentioned desires, it should be understood that some aspects of the invention might not necessarily obviate them.

BRIEF SUMMARY OF THE INVENTION

Among the many different possibilities contemplated, the inventive subject matter includes a method of playing an original 3D content on a 3D enabled display device where the 3D enabled display device does not support an original 3D format type of the original 3D content.

It is further contemplated that the method includes the steps of reading a portion the original 3D content to obtain an identity of the original 3D format type; detecting a display hardware; determining a supported 3D format type that the display hardware supports by first looking at the extended display identification data of the display hardware; and finding out whether or not there is a match between the original 3D format type of the original 3D content and the supported 3D format type that the display hardware supports. If there is a match, continuing to play the original 3D content and display the original 3D content on the display hardware. And, if there is not a match, converting the original 3D content into a converted 3D content having a converted 3D format type that matches with the supported 3D format type that the display hardware supports, and playing the converted 3D content and displaying the converted 3D content on the display hardware.

In preferred embodiments, the determining step includes comparing an identifying information of the display hardware with a look-up table, and wherein the look-up table is saved on a memory.

It is still further contemplated that the reading step, the detecting step, the determining step, finding step, and converting step, are performed by a processor, and the processor can either be a CPU or an image processing chip.

Contemplated converting step can include breaking apart image content and then restructuring image content based on the supported 3D format type. Further contemplated converting step can include decoding the original 3D image data and transforming the original 3D image data into the supported format.

Among the many possible ways to read a portion of the 3D content, one preferred way of reading step includes processing the portion of the original 3D content to determine the 3D format type, and wherein the portion is an image data.

In other preferred embodiments, the reading step includes processing the portion of the original 3D content to determine the original 3D format type, and the portion can contain a tag, and the tag contains information regarding the original 3D format type of the original 3D content.

Similarly and preferably, the determining step can include retrieving the identity of the supported 3D format type from a tag embedded in the display hardware.

In other contemplated embodiments, the detecting step, the determining step, the finding step are automatically instructed by a program of instructions, and the program of instructions is embedded in a member from the group consisting of a television, a set-top box, personal computer, a projector, a handheld device, a 3D content receiver, an image processing chip, a CPU, a standalone DVD player, and a DVD player software.

Another aspect of the invention is directed to methods of embedding a tag in a 3D content.

Yet another aspect of the invention is directed to methods of automatically detecting the need to perform the function of inverting images so that a user need not make such determination by his own naked eyes.

It is further contemplated to have a 3D content player that reviews and calculates the relative positions of the same images that are being played simultaneously to create the desired 3D effect, and to determine, base on their relative positions to each other, whether the 3D content is being displayed properly.

Further contemplated content player, once automatically detects that the images being played simultaneously are not oriented properly, is capable of automatically readjust the relative positions of the images so as to correct the misalignment. A preferred embodiment readjusts the images by inverting the images from left to right.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

It should be noted that the drawing figures may be in simplified form and might not be to precise scale. In reference to the disclosure herein, for purposes of convenience and clarity only, directional terms, such as, top, bottom, left, right, up, down, over, above, below, beneath, rear, front, distal, and proximal are used with respect to the accompanying drawings. Such directional terms should not be construed to limit the scope of the invention in any manner.

FIG. 4 is an illustration of frames exhibiting distinct characteristic of anaglyph 3D signal type. While FIG. 3 is in black and white, a colored illustration would clearly show separation of red image shadows from green images. This understanding is within one of ordinary skill in the art.

DETAILED DESCRIPTION OF THE INVENTION

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

As used herein, "3D content" refers to stereoscopic still images and motion videos, and can include 3D movies.

Figure 1:
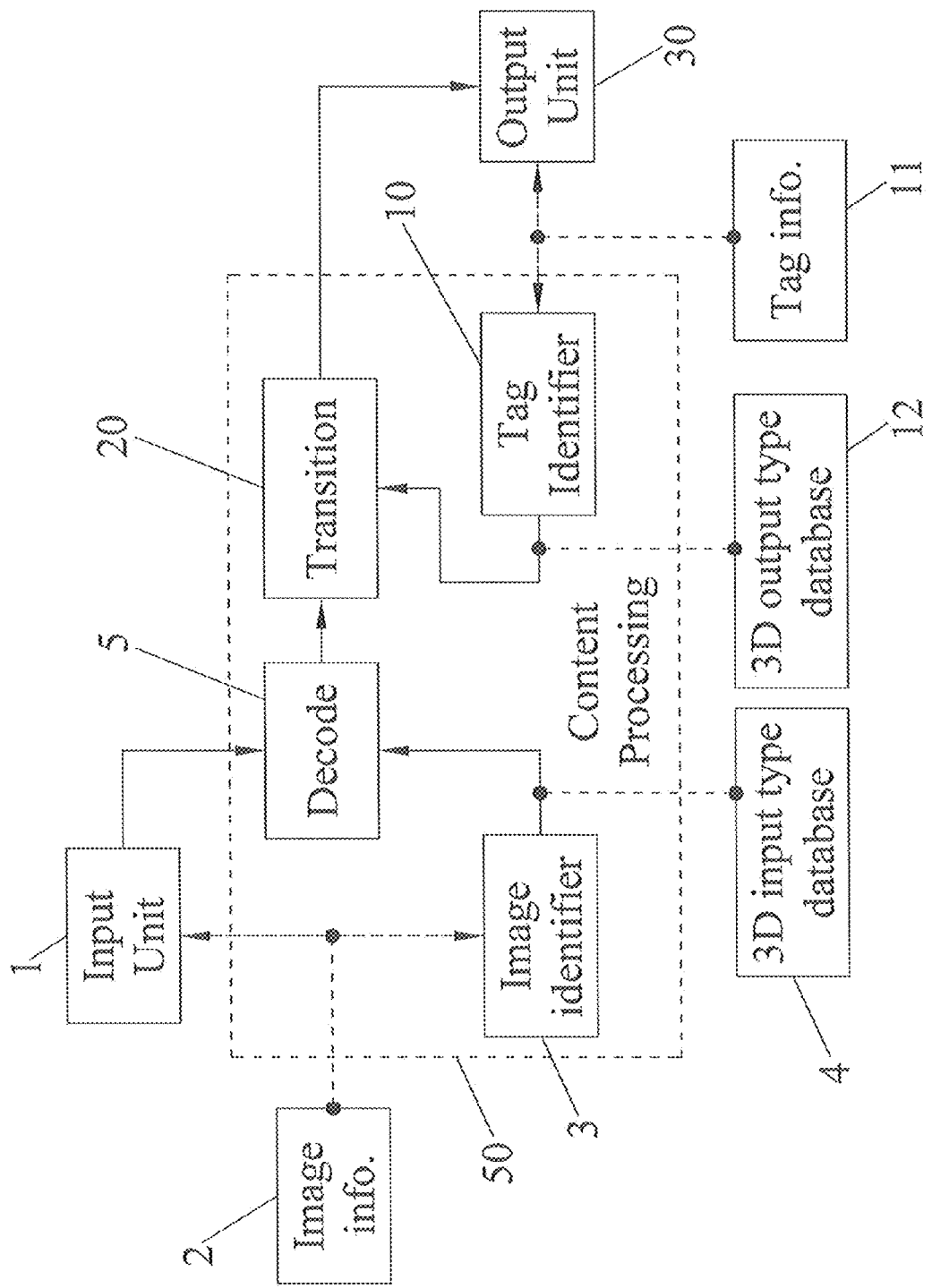
FIG. 1 is a flow diagram illustrating the steps of image process, where a portion of the original 3D content is processed to determine its original 3D format type.
Figure 2:
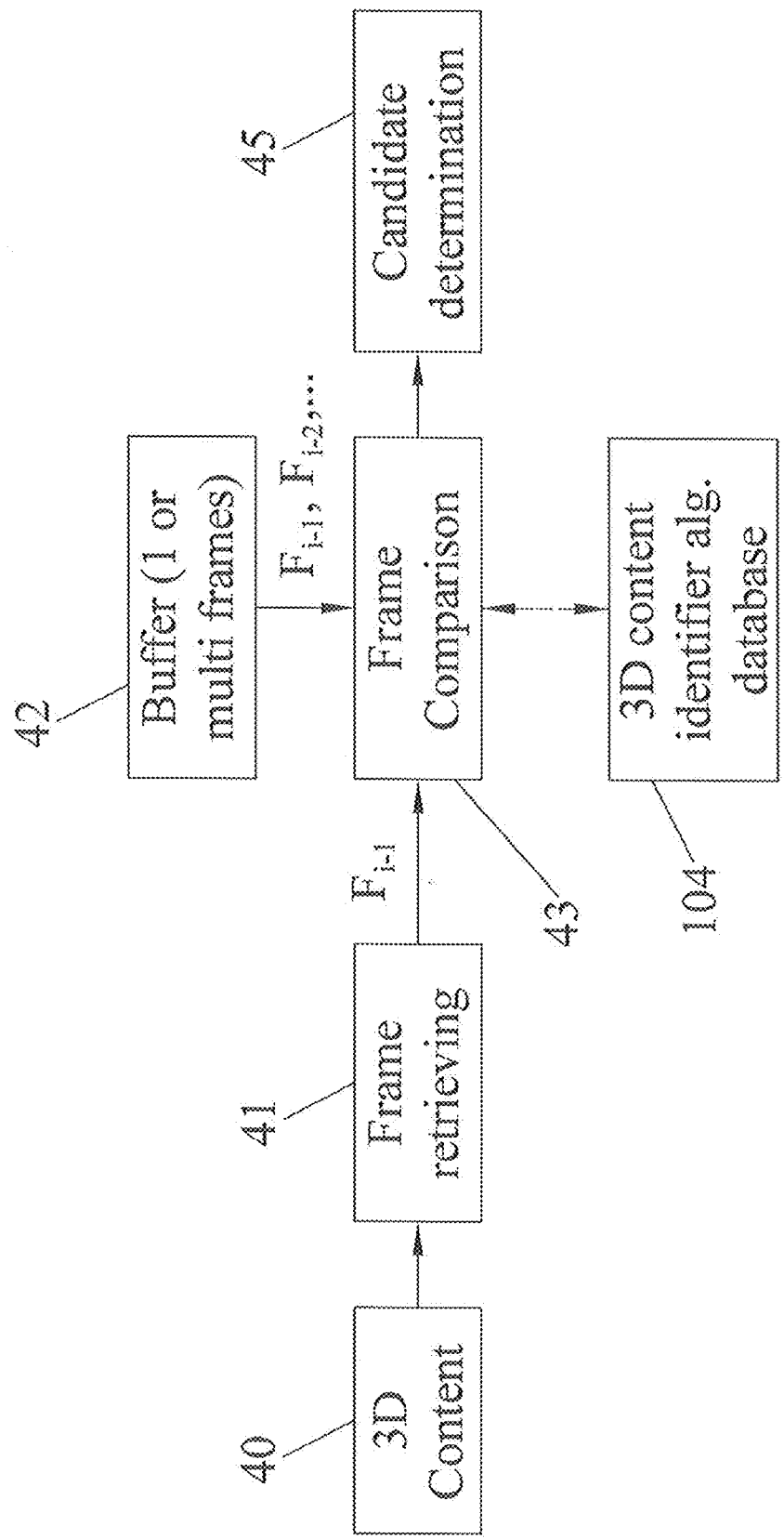
FIG. 2 is a flow diagram illustrating generally the overall process of one embodiment of the inventive subject matter.
Figure 3:
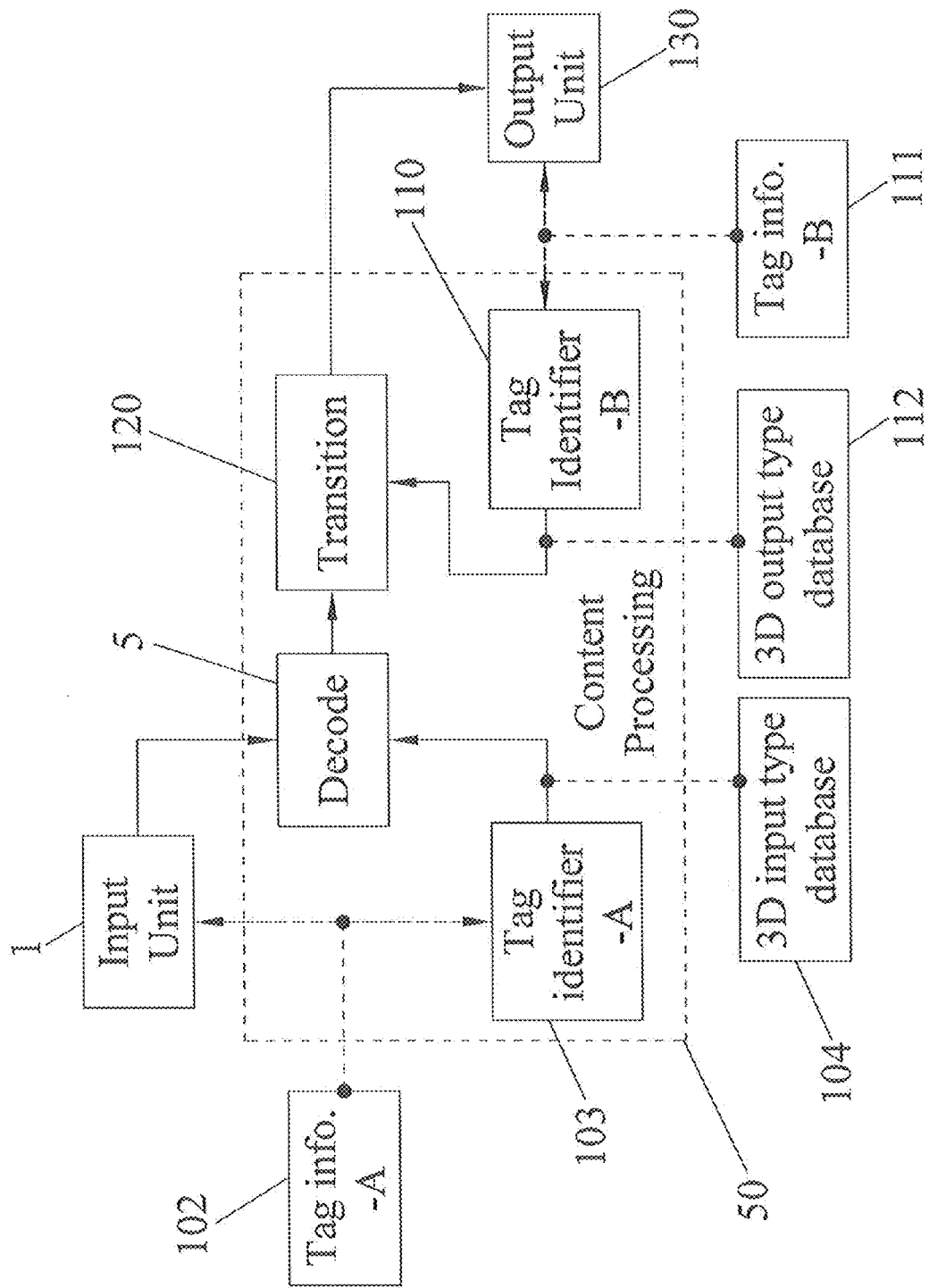
FIG. 3 is a flow diagram illustrating generally the overall process of another embodiment of the inventive subject matter where tags are used on the original 3D content to identify its input 3D format type.

Referring now to FIGS. 1-3, a contemplated method and system of displaying an original 3D content on a 3D enabled display device, where the 3D enabled display device can or cannot support an original 3D format type of the original 3D content, is disclosed.

In operation, the method/system includes having an input unit 1 to receive an input of the original 3D content 40. Contemplated input unit can include a television, a set-top box, a personal computer, a handheld device, a projector, a standalone DVD player, and a software to play DVD. Contemplated original 3D content 40 can be pre-stored on a 3D DVD or other media types, or can be a streamed content over the Internet or over other networks.

One of the intended goals of the invention is to be able display and watch various 3D contents 40, each having a different 3D input format type, on a display device 30 that only supports one or few 3D input format types. Therefore, contemplated original 3D content 40 can be of all known 3D input format types, for example, "side by side," "up/down," "over/under," "interlace," and "Analyph." One of ordinary skill in the art would readily recognize that various other format types known or to be developed in the future can also be implemented with the disclosed embodiments.

An important aspect of the preferred embodiments includes the ability to automatically obtain an identity 3 of the original 3D format type. There are at least two contemplated ways to automatically determine an identity 3 of the original 3D format type.

In first preferred way, when the input unit 1 reads (a reading step) a portion of the original 3D content, a contemplated algorithm 50 performs image processing as illustrated in FIG. 2. Here, a portion of the 3D content 40 includes image data, such as multiple numbers of frames ($F_{i-1}$, $F_{i-2}$, $F_{i-3}$ ... ). Frames are then retrieved 41, and compared 43. In one embodiment, a $F_{i-1}$ frame is compared with at least one frame (i.e., $F_{i-1}$, $F_{i-2}$, $F_{i-3}$ ... ) that is fed through a buffer 42. Due to the characteristics of each 3D input format type, one skilled in the art would immediately recognize that each 3D input format type would have a characteristic distinction when its frames are compared to each other.

Figure 4:
Figure 5:
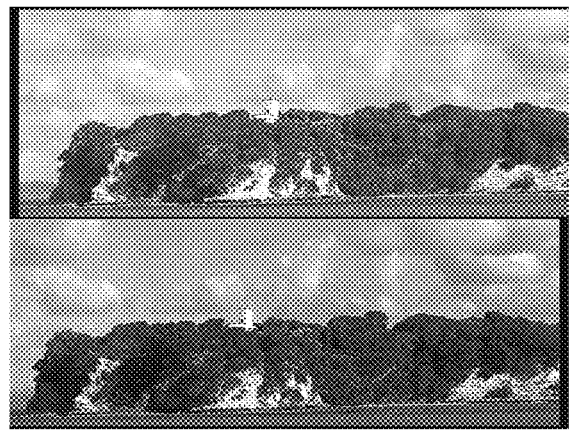
FIG. 5 is an illustration of frames exhibiting distinct characteristic of Over/Under.
Figure 6:
FIG. 6 is an illustration of frames exhibiting distinct characteristic of Side-by-Side.
Figure 7:
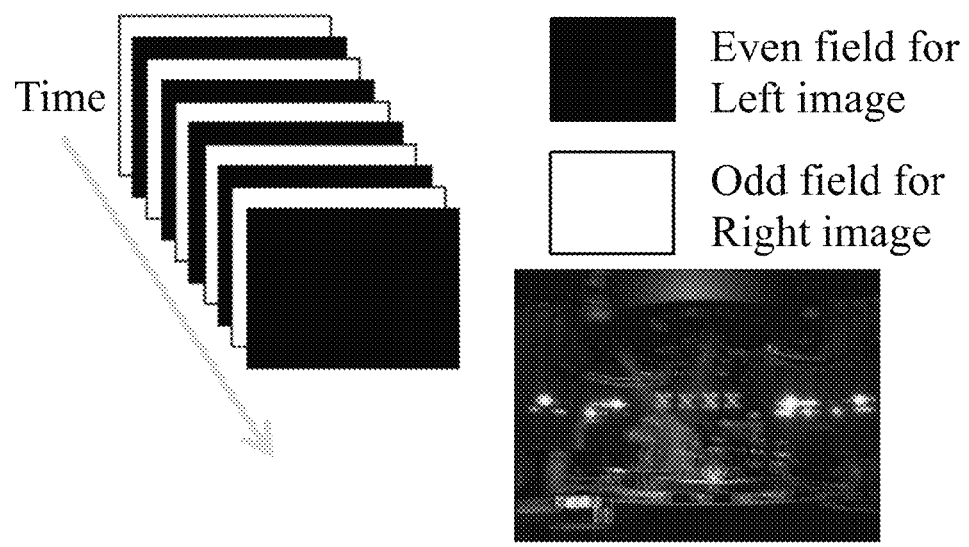
FIG. 7 is an illustration of frames exhibiting distinct characteristic of Field Sequential.
Figure 8:
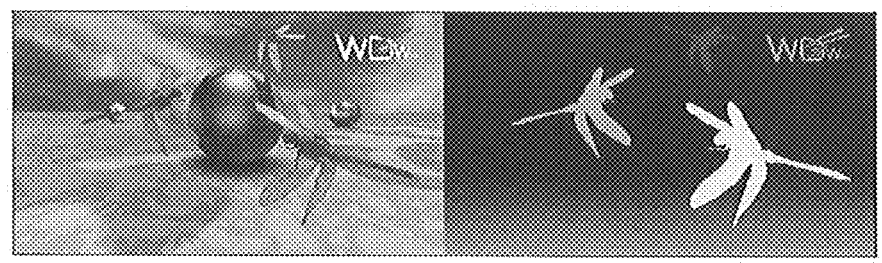
FIG. 8 is an illustration of frames exhibiting distinct characteristic of 2D plus Depth.

Some of the characteristic distinctions are illustrated in FIGS. 4-8. FIG. 4 shows an Analyph type of 3D input format. FIG. 5 shows an Over/under type of 3D input format. FIG. 6 shows a Side-by-Side type of 3D input format. FIG. 7 shows a field sequential type of 3D inpute format. FIG. 8 shows a 2D plus depth type of 3D input format.

In some embodiments, the contemplated method includes a determining step that includes comparing an identifying information of the display hardware with a look-up table. In operation, a 3D input type database 104 is provided to be accessible by the algorithm. The contemplated 3D input type database 104 contains information on the various characteristic distinctions relating to each 3D input format type. This database 104 can be stored on a memory coupled to the processor, or can be stored on the processor (e.g., CPU or image processing chip) which performs the disclosed method steps.

After comparison 43 is made between the frames, and after a characteristic distinction is detected, and after the characteristic distinction is compared with the 3D input type database 104, the identification 2 of the original 3D input type is found.

In the second preferred way to automatically obtain an identity 3 of the original 3D format type, an algorithm is configured to read a portion of the original 3D content. This portion of the original 3D content is contemplated to include a tag previously embedded, preferably embedded by the producer of the 3D content. Contemplated tag contains information regarding the original 3D format type of the original 3D content 40. Optionally, there can be tags for other information such as venue, category of movies, total time, actors, actresses, producers, directors, and 3D output format types. Such information can contain a selectable portion and a non-selectable portion similar to that found in MP3 files.

Regarding the tags, contemplated method utilizes a data format system wherein 3D content is digitally encoded in a media, and said data format is for storing information pertaining to the contents of the 3D content in said media. Further contemplated data format includes a header having a portion of non-selectable information, and a portion of selectable categorical information relating to the 3D content. In some preferred embodiments, the selectable categorical information includes a 3D input format type. Data format system such as those for MP3 files, and as described in U.S. Pat. No. 5,670,730 (which is incorporated herein by reference in its entirety), can be used in the preferred embodiments.

In operation, the contemplated algorithm must also know the 3D display output format type (11, 111), so it can decide whether or not data conversion 120 is necessary to watch the original 3D content 40. Contemplated 3D output format type supported by the inventive subject matter includes all known 3D output format types, such as "Analyph", "HQFS", "Polarized" and "Barrier & Lenticular."

The contemplated inventive subject matter includes more than one way to determine the 3D display output format type of the display hardware 30 that is electronically coupled to the input unit 1.

In a first contemplated way, the algorithm is configured to detect a display hardware 30 electronically coupled to the input unit 1 and to retrieve information from the extended display identification data (EDID) of the display hardware 30. As is typical in the industry, information such as supported 3D format type that the display hardware 30 supports can be located in the extended display identification data (EDID) of the display hardware 30. Here, the algorithm is configured to look into the EDID to retrieve such information.

In a second contemplated way, the algorithm is configured to retrieve identification of the display hardware 30, such as model and make of the display hardware. The algorithm will then compare the model and make of the display hardware 30 with a look-up table 12, 112, which is preferably stored in a memory. The contemplated look-up table 12, 112 contains information on most, if not all, available models and makes of display hardware 30, 130 and their corresponding supported 3D format type. This second way can be optional, or in addition, to the first way of detecting the supported 3D format type.

In a third contemplated way, and as illustrated in FIG. 3, the algorithm is configured to detect a supported 3D format type by first retrieving a tag 110 embedded in the display hardware 30. Such tag 110 can be embedded into the display hardware 130 by the manufacturer of the display hardware 130. This third way can be optional, or in addition, to the first way and/or second way of detecting the supported 3D format type.

In yet another contemplated way, the algorithm is configured to retrieve identification of the display hardware 30, such as model and make of the display hardware, and then link to the Internet to look for needed information. In other words, the algorithm will then search online, for example, at a designated server that has an updated look-up table. Once connected to the server, the algorithm compares the model and make of the display hardware 30 with the look-up table. The contemplated look-up table contains information on most, if not all, available models and makes of display hardware 30, 130 and their corresponding supported 3D format type.

As used herein, the term "display hardware" refers to any and all types of viewing device capable of supporting and enabling viewing 3D contents. For example, television, computer monitor, handheld devices, projector, Personal Digital Assistants (PDAs), mobile phones, and MP3 players with a viewing screen.

Contemplated method further includes having an algorithm configured to perform the step of finding out (a finding step) whether or not there is a match between the original 3D format type of the original 3D content and the supported 3D format type that the display hardware supports.

If there is a match, the algorithm is configured to continue playing the original 3D content 40 and displaying the original 3D content on the display hardware 30.

If there is not a match, the algorithm is configured to convert the original 3D content 40 into a converted 3D content in a transition procedure 40. The contemplated converted 3D content would then have a converted 3D format type that matches with the supported 3D format type that the display hardware 30 supports. The contemplated algorithm is configured to enable input unit 1 to play the converted 3D content and displaying the converted 3D content on the display hardware 30.

The contemplated converting step includes breaking apart images (decoding/transform step, e.g., transform to 2 views/multi views' content) and then restructuring (transit step) images base on the supported 3D format type. One skilled in the art would immediately recognize the actual steps needed to effectuate the breaking apart of images or image data.

Base on the usage and real world application, all or part of the herein mentioned steps and processes can be performed by a processor. In some contemplated embodiments, the processor can be a CPU or an image processing chip.

In yet some preferred embodiments, all or part of the herein mentioned steps and processes are automatically instructed by a program of instructions, and the program of instructions is embedded in a member from the group consisting of a television, a set-top box, personal computer, a handheld device, a projector, a 3D content receiver, an image processing chip, a CPU, a standalone DVD player, and a DVD player software. Any of these devices can be referred to as a 3D content processing device. Contemplated 3D content processing devices of the instant invention contains a processor; a memory in communication with the processor; and an algorithm to perform any or all of the herein mentioned steps and processes. Contemplated 3D content processing devices can also be a CPU, or an image processing chip, either of which is embedded in a machine such as a television, a set-top box, a personal computer, a handheld device, a 3D content receiver, a projector, a standalone DVD player, and a server.

Figure 9:
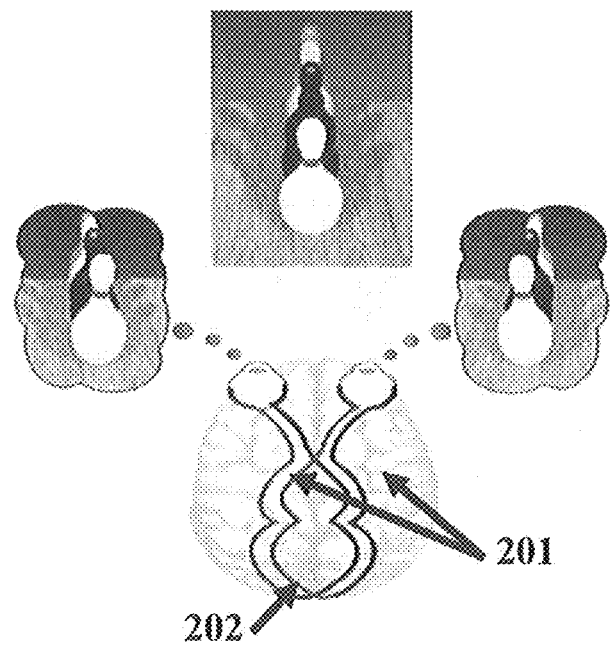
FIG. 9 is an illustration of how Left/Right images form a 3D image in a viewer's brain.

As previously mentioned, when displaying 3D contents on prior art devices, sometimes user-intervention is needed to readjust the output image. For example, when using Texas Instruments' DLP® technology-enabled projector, images for the left eye and images for the right eye are shown simultaneously to create the desired 3D effect. As shown in FIG. 9, the image intended for the left eye is an image showing one angle of an object, and the image intended for the right eye is an image showing another angle of an object (201). When each eye receives the its intended image, and when the two images are combined in the brain (202), the combination image now contains depth to create the desired 3D effect.

In prior art devices, there is offered a setting in the menu for a user to manually invert images. For example, sometimes the left images are incorrectly displayed on the right side, and the right images are incorrectly displayed on the left side. Only when a user/operator recognizes this mistake by looking at the displayed content, will he appreciate the need to invert the images. This creates a number of problems in the operation of such prior art devices. First, a user or an operator of the 3D player/projector cannot always readily recognize such incorrect display of images. This negatively affects the viewing audience's viewing enjoyment and experience. Second, when the projector operator finally realizes that the images need to be inverted, the operator would need to manually instruct the device to "invert" images. This usually means the operator would go through a menu and select "invert image" from a selection of choices.

One embodiment of the contemplated system has an optional function to automatically detect incorrectly displayed images, and to automatically invert images when needed, to properly produce the desired 3D effect.

In another embodiment of the contemplated method/system, the contemplated 3D content player reviews and calculates the relative positions of the same images that are being played simultaneously, and determines, base on their relative positions to each other, whether the 3D content is being displayed properly.

In theory, in a 3D format where the images are displayed left/right (e.g., see FIG. 9), and where such proper left/right orientation is the determining factor in creating the 3D effect, one can determine which image is intended to be displayed on the left, and which on the right, by first moving each image on a X-axis, and then compare the degree of similarity between the two images.

For example, suppose A/B are two images to be displayed simultaneously. One can take image A, and move it along an X-axis. +Xi means moving image A towards the right, and −Xi means moving image A towards the left. And now suppose during +Xi movement, A/B shows the greatest level of similarity in content characteristics. This would reveal that there is a high probability that image A is intend to be on the left, and image B intended on the right. Conversely, if during −Xi movement of image A, A/B shows the greatest level of similarity in content characteristics, this would reveal that there is a high probability that image A is intend to be on the right, and image B intended on the left. Once the proper orientation can be detected and identified, one can perform the inversion of images.

In operation, a framebuffer can effectively perform the above discussed comparison by first moving each image along an X-axis. As known in the art, a framebuffer is a video output device that drives a video display from a memory buffer containing a complete frame of data. The framebuffer can play the A/B images and move at least one of A/B along the X-axis from memory buffer.

The left/right identifier, automatically signals the system to invert the A/B images, when the identifier determines that the A/B images are not being played in the proper orientation. The system in turn, automatically inverts the A/B images as directed by the left/right identifier.

Figure 10:
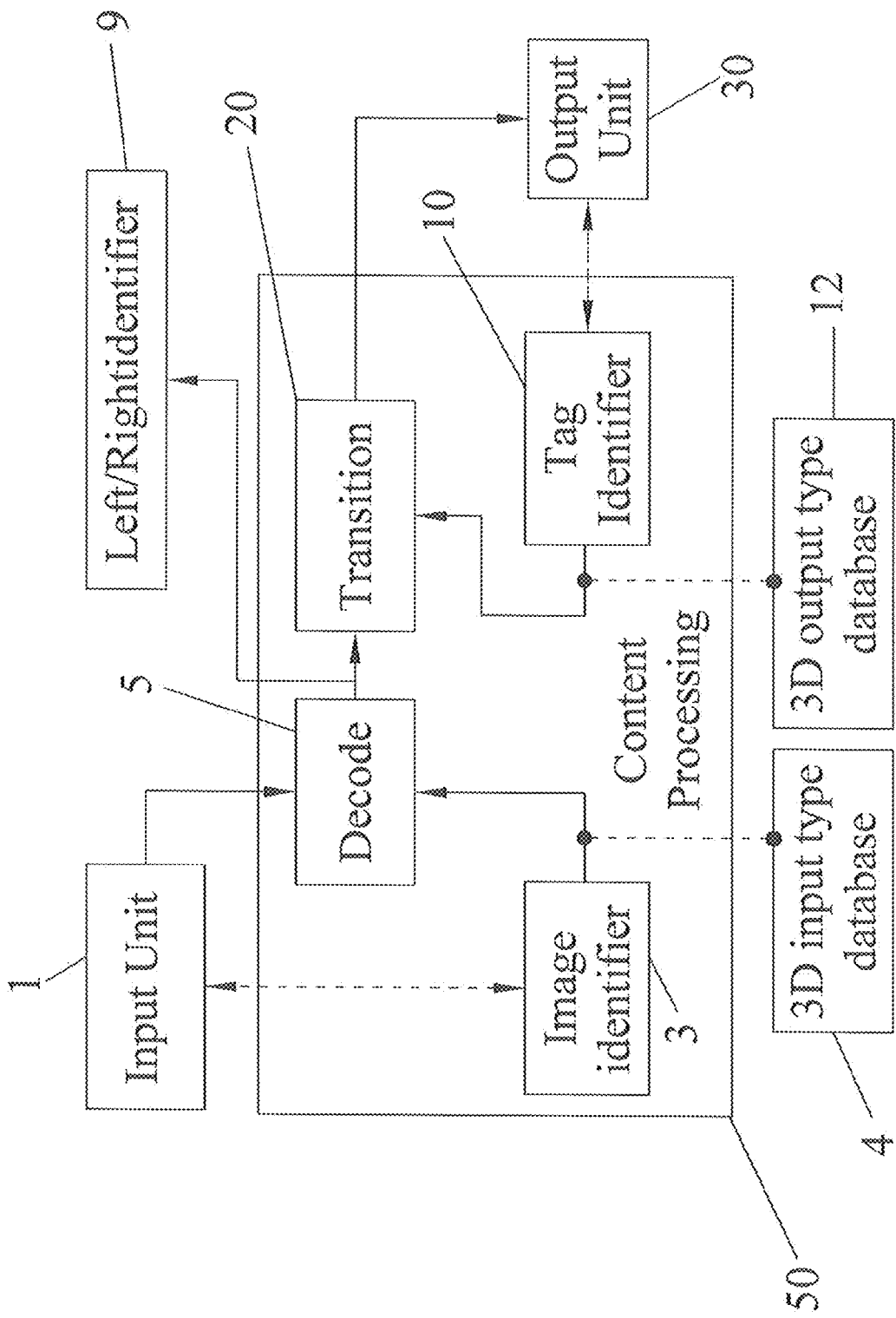
FIG. 10 is a flow diagram illustrating generally the overall process of yet another embodiment of the inventive subject matter where an optional left/right identifier is used on the to detect the need to invert left/right images.

And, in combination with preferred embodiments of the current invention, the operational step of this left/right identifier is preferably done after decoding of the original 3D content as shown by FIG. 10.

Thus, specific embodiments and applications of Stereoscopic Auto-Judging Mechanism have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. In addition, where the specification and claims refer to at least one of something selected from the group consisting of A, B, C . . . and N, the text should be interpreted as requiring only one element from the group, not A plus N, or B plus N, etc.

What is claimed is:

1. A method of displaying an original 3D content on a 3D enabled display device where the 3D enabled display device does not support an original 3D format type of the original 3D content, said method comprising:

reading a portion the original 3D content to obtain an identity of the original 3D format type;

detecting a display hardware;

determining a supported 3D format type that the display hardware supports by first looking at the extended display identification data of the display hardware, wherein the determining step further comprises the step of identifying the proper orientation of at least one image being displayed simultaneously, by moving the at least one image along an X-axis, and compares a similarity between the said at least one image with another image;

finding out whether or not there is a match between the original 3D format type of the original 3D content and the supported 3D format type that the display hardware supports;

if there is a match, continuing playing the original 3D content and displaying the original 3D content on the display hardware; and if there is not a match, converting the original 3D content into a converted 3D content having a converted 3D format type that matches with the supported 3D format type that the display hardware supports, and playing the converted 3D content and displaying the converted 3D content on the display hardware.

2. The method as recited in claim 1, wherein the determining step further includes comparing an identifying information of the display hardware with a look-up table, wherein said look-up table is saved on a memory device.

3. The method as recited in claim 2, wherein the reading step, the detecting step, the determining step, finding step, and converting step, are performed by a processor, and wherein said processor is either a CPU or an image processing chip.

4. The method as recited in claim 3, wherein the converting step includes breaking apart images and then restructuring images based on the supported 3D format type.

5. The method as recited in claim 4, wherein the reading step comprises processing the portion of the original 3D content to determine the original 3D format type, and wherein the portion contains a tag, and the tag contains information regarding the original 3D format type of the original 3D content.

6. The method as recited in claim 4, wherein the reading step comprises processing the portion of the original 3D content to determine the 3D format type, and wherein the portion is an image data.

7. The method as recited in claim 6, wherein the determining step further includes retrieving the identity of the supported 3D format type from a tag embedded in the display hardware.

8. The method as recited in claim 6, wherein the detecting step, the determining step, the finding step are automatically instructed by a program of instruction, and the program of instructions is embedded in a member from the group consisting of a television, a set-top box, personal computer, a handheld device, a 3D content receiver, an image processing chip, a CPU, a standalone DVD player, and a DVD player software.

9. A 3D content processing device to play an original 3D content having an original 3D format type, so that the original 3D content can be displayed on a display hardware which does not support the original 3D format type, the processing device includes:
   a processor;
   a memory in communication with the processor;
   an algorithm configured to read a portion the original 3D content to obtain information regarding the original 3D format type;
   an algorithm configured to detect a supported 3D format type of the display hardware by first looking at the extended display identification data (EDID) of the display hardware, wherein the display hardware is electronically coupled to the processing device;
   an algorithm configured to find out whether or not there is a match between the original 3D format type and the supported 3D format type;
   an algorithm configured to play the original 3D content and send the original 3D content to the display hardware if there is a match;
   an algorithm configured to convert the original 3D content into a converted 3D content having a supported 3D format type, and playing the converted 3D content and send the converted 3D content to the display hardware, if there is not a match; and
   a frame buffer configured to move at least one image along an X-axis, among a plurality of images being displayed simultaneously, and compares a similarity between the said at least one image with another image.

10. The 3D content processing device as recited in claim 9, wherein the device is embedded in a machine, wherein the machine is selected from the group consisting of a television, a set-top box, personal computer, and a handheld device.

11. The 3D content processing device as recited in claim 10, wherein the portion is an image data, and the reading of the portion includes playing the image data.

12. The 3D content processing device as recited in claim 10, wherein the portion includes a tag embedded in the 3D content, wherein the tag contains identity of the original 3D format type.

13. The 3D content processing device as recited in claim 12, wherein the algorithm is processed on an image processing chip, and the chip is disposed within the 3D processing device.

14. The 3D content processing device as recited in claim 12, wherein the algorithm is processed on a CPU, and the CPU is disposed within the 3D processing device.

15. The 3D content processing device as recited in claim 13, wherein the algorithm is configured to detect a supported 3D format type of the display hardware by looking at an embedded tag of the display hardware, wherein the embedded tag contains identity of the supported 3D format type.

* * * * *